Sept. 22, 1970  J. F. KISHEL  3,529,615
FLUID APPARATUS FOR DETECTING ACOUSTIC SIGNALS
Filed June 12, 1968  2 Sheets-Sheet 1

INVENTOR.
Joseph F. Kishel
BY
ATTORNEY

United States Patent Office 3,529,615
Patented Sept. 22, 1970

3,529,615
FLUID APPARATUS FOR DETECTING ACOUSTIC SIGNALS
Joseph F. Kishel, Clarks Summit, Pa., assignor to Weston Instruments, Inc., Newark, N.J., a corporation of Delaware
Filed June 12, 1968, Ser. No. 736,358
Int. Cl. F15c 1/18
U.S. Cl. 137—81.5                                    12 Claims

ABSTRACT OF THE DISCLOSURE

A fluidic apparatus utilizes two fluid amplifiers of the turbulence type which are made differently responsive, that is respectively turbulent and laminar, to a control signal frequency or band of control signal frequencies of interest. The control signal may be an acoustic energy signal at ultrasonic frequency. To make the amplifiers thusly responsive, the gap which is characteristically provided between fluid supply and fluid collector tubes of each amplifier to permit energy interactions between each unbounded fluid power stream issuing from the supply tube and the control signal is of a different dimension considered along the path of normal laminar power stream flow between said tubes. Each gap dimension is determined by a different one of the control signal frequencies which respectively define the high and low cutoff frequencies for the frequency of interest; the collector tubes receiving different valued logical outputs when this frequency is within the thusly established frequency band.

---

This invention relates generally to fluid apparatus and, more particularly, to fluidic apparatus employing fluid amplifiers of the turbulence type to detect acoustic signals and especially acoustic signals of ultrasonic frequency.

Fluid amplifiers of the turbulence type (hereinafter referred to as "turbulence amplifiers") constitute one recognized type of fluidic amplifier which typically requires no moving mechanical parts to operate. This type of amplifier includes an elongated supply tube or nozzle from which a fluid (liquid or gas) stream issues at some relatively low and constant pressure. The fluid issuing from the supply tube flows across an otherwise open gap into a fluid collector tube; the length of the gap being the dimension parallel to the direction of fluid flow between the upstream-most end of the collector tube and the downstream-most end of the supply tube. The supply tube is usually made long enough so that the fluid stream issuing therefrom and flowing through the gap is laminar or practically laminar, in which case all, or substantially all, of the fluid stream may be received by a collector tube mounted with its longitudinal axis coaligned with the longitudinal axis of the supply tube. Thus, as long as the fluid stream which flows through the gap remains laminar all, or substantially all, of the fluid emitted from the supply tube will be received by the collector tube.

It is known in the art that a laminar stream flowing in the gap between the supply and collector tubes of a turbulence amplifier is subject to complete disruption or dispersion through energy interaction with a smaller magnitude disturbing signal, hereinafter referred to as the "control signal." Whether a small control signal, when directed to interact with the main laminar stream of such an amplifier, will cause a disruption of the main stream or be dampened out by that stream depends upon several variable and complex factors which are discussed in the available technical literature and hence do not merit repetition. For example, in an article entitled, The Stability of a Two-Dimensional Laminar Jet, by T. Tatsumi and T. Kakutani published in the Journal of Fluid Mechanics, vol. 4, 1958, pages 261–275 thereof, the authors derive a typical solution for such a stream having some particular Reynolds number and indicate that there is a determinable range of control signal frequencies for which the stream will be unstable and other control signal frequencies on either side of this determinable control signal frequency range for which the same stream will manifest stability. This known frequency response characteristic of a turbulence amplifier to control signals of some particular frequency or range of control signal frequencies has been utilized by others engaged in the design of such amplifiers.

It is an object of this invention to provide fluid apparatus which utilizes to advantage the different frequency responses available from two turbulence amplifiers having different known frequency responses to control signals, especially ultrasonic acoustic control signals.

Another object of this invention is to provide a fluidic device which may be easily tuned to detect a prescribed portion of the frequency spectrum of an acoustic control signal.

Yet another object of this invention is to provide a variable bandwidth fluidic detector of ultrasonic acoustic control signals.

Still another object of this invention is to provide a fluidic frequency-to-digital converter for acoustic control signals, especially ultrasonic acoustic control signals.

Still another object of this invention is to provide a fluid signal detection apparatus having a selectable bandwidth which apparatus may be driven to sweep a given band of fluid signal frequencies, especially ultrasonic signal frequencies.

The apparatus of this invention utilizes as one of its basic components a fluidic frequency detector which converts a received acoustic signal having some dominant frequency of interest and preferably some dominant ultrasonic frequency into coincidental output signals of different binary digital ("bit") values.

The detector comprises two turbulence amplifiers located sufficiently proximate one another to receive simultaneously an acoustic signal which is applied as a control (or input) signal to both amplifiers. Each of the two amplifiers is tuned to be responsive to a different ultrasonic frequency, the two different frequencies to which the amplifiers are tuned establishing therebetween a frequency bandpass which includes the acoustic signal frequency of interest. Thus tuned, and in response to an applied acoustic control signal having a dominant frequency within the established bandpass, one amplifier produces a "high" level fluid output signal, representing, for example, a 1 binary digit or 1 bit and the other amplifier coincidentally produces a "low" level fluid output signal, representing in this example, a 0 bit. The tuning of both amplifiers may be readily and easily effected through the relatively simple expedient of changing the lengths of one or both of the gaps. Through this expedient, the fluidic device may be tuned to a different bandpass frequency and/or to a different desired mid-bandpass frequency.

The coincidental different valued logical output signals available from this device may be converted into a fluid output pulse for driving or controlling other devices by coupling suitable fluidic logic components to the output of the device. In such case the resulting apparatus may properly be considered as being a pure fluid or "fluidic apparatus" as the term is used in this art since it requires no moving parts, other than the requisite working fluids to function as desired.

Moreover, for those applications that tolerate the employment of moving mechanisms, the aforedescribed detector may be mechanically driven to periodically or randomly sweep a prescribed band of acoustic frequencies by periodically or randomly reciprocating the supply and collector tubes of both turbulence amplifiers in directions parallel to the longitudinal axes thereof.

For a better understanding of the present invention, together with other and future objects thereof, reference may be had to the following description taken in connection with the accompanying drawings, the scope of the invention being pointed out in the appended claims.

Referring to the drawings.

Figure 1:
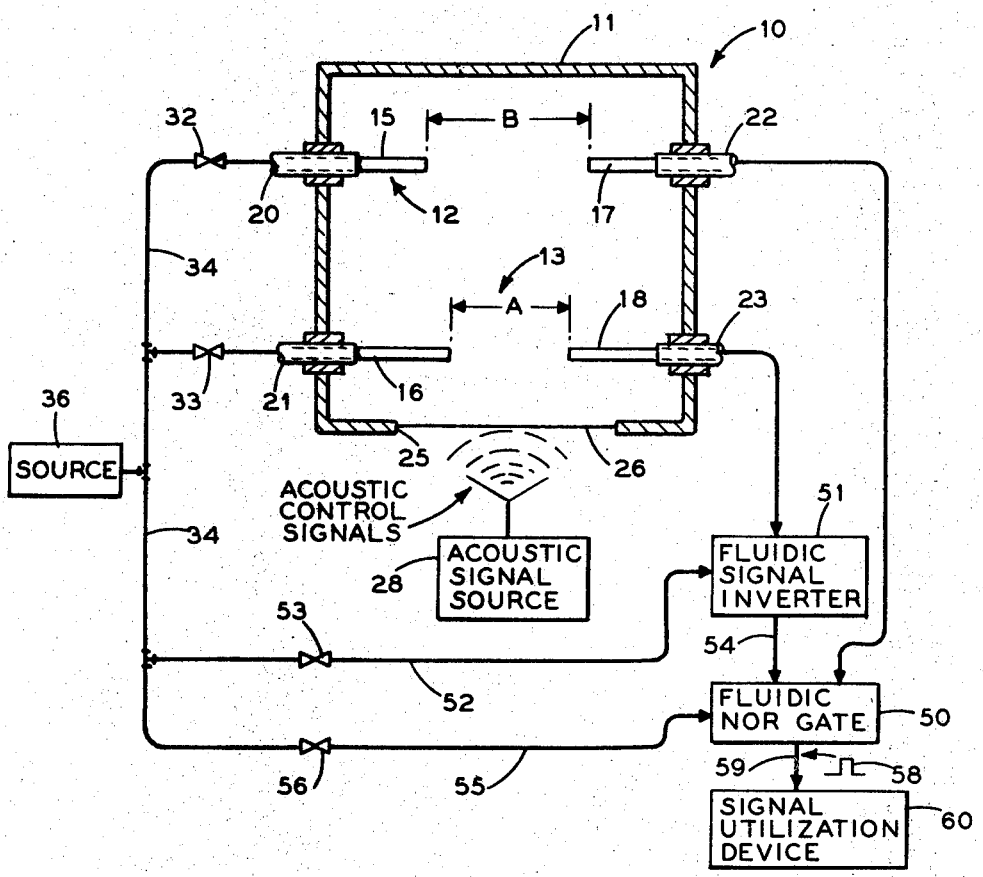
FIG. 1 illustrates one embodiment of an apparatus constructed in accordance with the principles of this invention.

Referring now to FIG. 1, there is illustrated one embodiment of a fluidic apparatus constructed in accordance with the principles of this invention. The apparatus includes a fluidic device 10 which may be used in combination with other fluidic components to effect, for example, the conversion of certain binary fluid output signals produced by the device 10 into a single fluid output pulse suitable for driving or controlling other devices or systems.

The device 10 includes a housing 11 which mounts a pair of turbulence amplifiers designated generally by the numerals 12 and 13, respectively. Each turbulence amplifier comprises a fluid supply tube and a fluid collector tube, the supply tubes being fixedly mounted in one side wall of the housing 11 and the collector tubes being fixedly mounted in an opposite side wall in coaligned relationship with a different one of their respective supply tubes. The supply tubes for the amplifiers 12 and 13 are designated 15 and 16, respectively, and the collector tubes for these respective amplifiers are designated 17 and 18. The supply tubes 15 and 16 may be of identical size and shape, typically taking the form of cylindrical metal tubes of length sufficient to insure that the fluid stream (liquid or gas) which issues from each supply tube is at least practically laminar. Similarly, the collector tubes 17 and 18 are typically cylindrical metal tubes which may be of identical size and shape and being axially aligned with their respective fluid-emitting supply tubes 15 and 16, receive all, or substantially all, of the laminar streams which issue from their respective supply tubes. Since the collector tubes normally only serve to receive or collect the laminar streams issuing from the supply tubes, the length of the collector tubes may be substantially less than the length of the supply tubes.

Construction of the device 10 is facilitated by mounting the turbulence amplifiers in mutually parallel relationship. The supply and collector tubes of each turbulence amplifier are axially separated from each other by a gap, the gap of the turbulence amplifier 12 being designated in FIG. 1 of the drawing as gap B and the gap of the turbulence amplifier 13 being designated as gap A. Differences in length between the gaps A and B determine what may be regarded as the "band width" or the "bandpass" of the device 10. By varying or changing one or both of these gap lengths it is possible to "tune" the device 10 to respond to only a particular control signal frequency or range of control signal frequencies. This aspect of the invention will be discussed herein in greater detail subsequently and therefore it suffices to state here that for some applications, especially when it is required to change the bandpass frequency or the bandpass frequency range of the device 10, additional mechanism may be required to change the lengths of the gap A and/or the gap B, simultaneously or successively.

The adjustment of the length of the gap A and/or the gap B may be simply accomplished by forming external threads on the supply and collector tubes and having these external threads mate with internal threads of the same pitch formed in the tubes which supply and receive fluid from the supply and collector tubes, respectively. The tubes which supply fluid to the supply tubes 15 and 16 are designated by the numerals 20 and 21, respectively, and the tubes which receive fluid from the collector nozzles 17 and 18 are designated by the numerals 22 and 23, respectively. With the tubes 15, 16, 17 and 18 in threaded engagement with their respective tubes 20, 21 and 22, 23 and the latter tubes fixed via grommets or sleeves, for example, to the sidewalls of the housing 11, the length of either gap A or B may be easily increased or decreased by manually turning, in one direction or the other, one or both of the supply and collector tubes which define the particular gap or gaps.

Figure 1A:
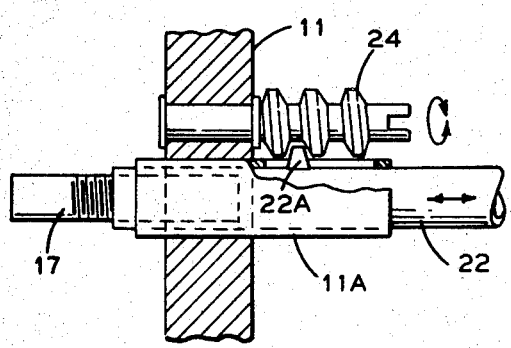
FIG. 1A is another embodiment of the invention illustrating mechanism for changing the bandpass frequency of the apparatus.

If it is desired that each gap length be adjusted externally of the housing 11, various ones or all of the tubes which supply and receive fluid from the supply and collector tubes may be translated longitudinally through operation of a mechanism which is mounted to project externally from the housing 11. One such mechanism is illustrated by FIG. 1A and includes a worm 24 which is mounted solely for rotation on one sidewall of the housing 11; the worm 24 having its outermost end slotted to accommodate the blade tip of a screwdriver which may be used to turn the worm as indicated by the circular arrows. The worm 24 meshes with a spur or tooth 22A which is fixed to, and projects radially from, the periphery of a tube. The tooth 22A is accommodated for limited movement perpendicular to the adjacent sidewall of the housing by a longitudinal slot formed in the upper surface of a grommet 11A. The grommet 11A is fixed to the same sidewall by, for example, a suitable adhesive, so that rotation of the worm 24 about its axis in one direction is converted by the tooth 22A into a corresponding horizontal displacement of the collector tube, as indicated by the horizontal arrows, until the desired change in the length of the gap B is effected. It will be apparent to those working in the art that other types of mechanisms may be used to effect a change in lengths of gaps A and/or B and that the illustrated embodiments are merely exemplary of two rather simple techniques for effecting this result. Obviously, other mechanism could also be readily provided which would effect the simultaneous axial displacement of two supply or collector tubes.

Ambient environmental conditions permitting, the housing 11 may have one of its ends open, as indicated at 25, or both of its ends open (not shown) to permit substantial unattenuated transmission of an externally received control signal into an energy interacting relationship with the laminar fluid streams flowing through the gaps A and B. In other instances, such as where the ambient atmosphere is turbulent or contains entrained foreign matter which might foul the collector tubes, or if the device is to be utilized while immersed in a liquid such as seawater, it may be necessary to isolate the interior of the housing 11 from the surrounding environment. In such case the opening 25 may be covered by a diaphragm 26 the peripheral edge thereof being clamped or sealed in fluidtight relationship to the edge defining the opening 25. The diaphragm 26 is selected to transmit the control signal to the interior of the housing 11 with negligible attenuation of the control signal magnitude and frequency. A few thousandths of-an-inch thick sheet of Mylar or aluminum foil, for example, have been found to be satisfactory for this purpose.

As mentioned hereinabove, ultrasonic acoustic signals constitute a preferred form of control signal for the device 10 and are depicted as being derived from a source 28. The source 28 is exemplary of various conventional ultrasonic acoustic signal sources such as piezoelectric crystal transducers, tuning forks, ultrasonic whistles knife edge jets, and ultrasonic fluidic oscillators. Other suitable sources will be evident to those working in this art.

Tubes 20 and 21 receive fluid at some preestablished static pressure (and/or flow rate) from a common line 34 which is coupled to a fluid supply source 36. The source 36 may comprise any suitable source of liquid or gas and may comprise, for instance, a tank of compressed air. Pressure and/or flow regulating valves 32 and 33 are interposed between the tubes 20 and 21, respectively, and the line 34 and these valves may be manually turned or otherwise adjusted to provide the tubes 15 and 16, respectively, with fluid at the desired static pressure (and/or flow rate). The static pressure of each fluid stream issuing from the tube 15 or 16 may not be exactly equal and in fact, may vary substantially as long as the pressures which are recovered by the collector tubes 17 and 18 under laminar flow conditions is high enough to drive devices which are coupled to receive those output signals.

Figure 2:
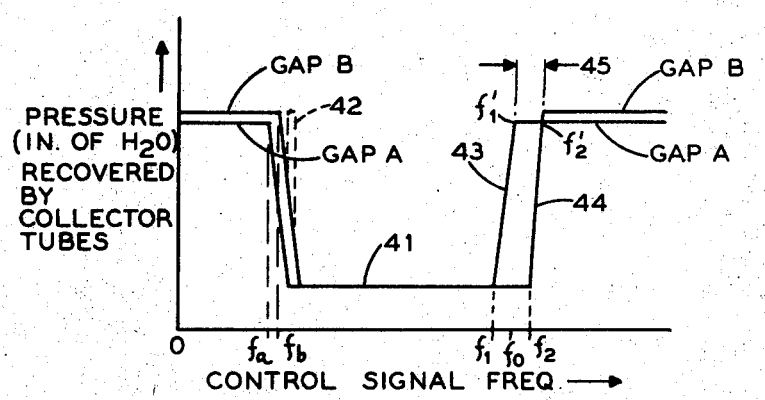
FIG. 2 illustrates typical transfer characteristic curves of the instant apparatus.

FIG. 2 is a typical plot of the transfer characteristics of each turbulence amplifier 12 and 13, the transfer characteristic curve of the amplifier 12 being designated gap B and the transfer characteristic curve of the turbulence amplifier 13 being designated gap A. The term "transfer characteristic," as used herein, refers to the relationship between the static pressure (and/or flow) which is received by each turbulence amplifier collector tube 17 or 18 as a function of the frequency of the acoustic control signal which interacts with the fluid stream flowing through an otherwise open gap. Plotted values for the two curves illustrating the transfer characteristics of each turbulence amplifier 12 and 13, may be obtained by a relatively simple method which is summarized as follows.

The source 28 is made a variable, calibrated frequency source capable of producing acoustic signals at sonic and ultrasonic frequency. A conventional piezoelectric crystal oscillator having a variable frequency range ranging from zero cycles per second to, for example, 40 kcs. is suitable for this purpose. The source is positioned so that the acoustic signals emitted therefrom are directed to interact with the fluid streams which flow through the gaps A and B. The gap distance of one of the gaps, for example gap A, is fixed at some reasonable value and the valve 33 manually turned in a direction which causes the static pressure of the fluid supplied to the tube 16 to increase until the desired static pressure level is attained in the collector tube 18 with laminar fluid flow through the gap A. If the fluid supplied to the tube 16 is assumed to be air, the static pressure level of the fluid connected by the tube 18 may be visually monitored through the use of a conventional manometer (not shown) appropriately coupled to the end of the tube 23.

Once the desired level of the fluid output signal is obtained under a condition of laminar flow through the gap A, the frequency of the variable frequency signal source is then slowly increased from zero cycles per second through the sonic frequency range and into the ultrasonic range stopping at, for example, an ultrasonic frequency of 40 kcs. Each significant variation in the fluid level of the manometer is recorded along with the control frequency signal which caused the variation. With recorded values of pressure recovered plotted on the ordinate (or Y) axis of an X-Y coordinate system and recorded values control signal frequency corresponding thereto plotted on the abscissa (or X) axis, the plotted points when joined by a line, typically delineate a curve substantially like that depicted by the curve designated gap A in FIG. 2.

This procedure is then repeated for the turbulence amplifier 12 to determine its transfer characteristic with the same or a different length of gap length for the gap B. To render the two transfer characteristics more readily distinguishable in the two "high" pressure recovery regions, the static pressure level of the fluid issuing from the tube 12 could be, and is illustrated as being, slightly higher than the static pressure of the fluid issuing from the nozzle 16. Assuming that the turbulence amplifiers 12 and 13 are similar in all respects with the important exception that the length of the gap B is made slightly longer than the length of the gap A, a plot on the same coordinate axes of the transfer characteristic of the amplifier 12 will yield a curve similar to that illustrated by the curve which is designated gap B in FIG. 2.

One embodiment of the device 10 having transfer characteristics similar to those depicted by the curves of FIG. 2 was constructed as follows:

Housing 11—6 inches square
Length of each tube 15 and 16—3 inches
Length of each tube 17 and 18—0.5 inch
Internal diameter of each tube 15, 16, 17, 18—.03 inch
Fluid employed in turbulence amplifiers—Compressed air
Pressure of air in tube 15—15 inches of $H_2O$
Pressure of air in tube 16—14 inches of $H_2O$
Length of gap A—0.875 inch
Length of gap B—1.250 inches
Lateral distance between tubes 15, 16 and 17, 18—1.5 inches
Pressure of air recovered by tube 17—4 inches of $H_2O$
Pressure of air recovered by tube 18—3.8 inches of $H_2O$
Opening 25—2-inch diameter
Diaphragm 26—0.003 in. thick sheet of Mylar
Source 28—Piezoelectric Crystal, Model BA-118 manufactured by Piezoelectric Division, Clevite Corp., 232 Forbes, Bedford, Ohio.

Considering now each of the two curves of FIG. 2 in greater detail, it can be seen that as the control signal frequency increases from zero cycles per second to a higher frequency value, $f_a$, the relatively "high" pressure recovered by the collector tube 18 remains substantially constant. Similarly the relatively "high" pressure recovered by the collector tube 17 remains substantially constant for a slightly higher acoustic frequency, $f_b$. The acoustic frequencies $f_a$ and $f_b$ correspond to respective initial maximum frequency values for conditions of laminar flow through the gaps A and B, and hence correspond to the maximum frequencies at which "high" valued output signals still appear in the collector tubes 23 and 24, respectively. For reasons known to at least some degree of certainty by those skilled in this art, slight increases in the frequencies of $f_a$ and $f_b$ will render turbulent the laminar flow through the gaps A and B causing the pressure recovered by each respective collector tube 23 and 24 to drop sharply to a significantly lower level, for example, to zero p.s.i.g. This "low" output signal level is depicted by a horizontal line designated 41 in FIG. 2 and represents a control signal frequency band having its lower frequency limits or ends ($f_a$ and $f_b$) in the sonic frequency range and its upper frequency limits or ends $f_1$ and $f_2$ in the ultrasonic frequency range. The transformation from the initial high pressure recovery level to this low pressure recovery level which occurs in this region of the transfer characteristic is not always continuously linear, as depicted by the curve designated gap A in FIG. 2. Oftentimes, and as indicated by the substantially vertical dashed lines 42, the pressure recovered by one or both of the collector tubes may peak sharply at some particular control signal frequency or range of frequencies in this region. The sharp departure from linearity which may be exhibited in this region of the transfer characteristic is one reason I prefer to establish the "bandpass" of the device 10 at a considerably higher frequency region of the transfer characteristic which is normally devoid of such sharp departures from linearity.

As the control signal frequency continues to increase leaving the sonic frequency range and entering the ultrasonic frequency range the condition of turbulence remains until, for the turbulence amplifier 13, an ultrasonic signal of $f_1$ cycles per second interacts with the fluid streams flowing through the gaps A and B. At this critical frequency a laminar flow condition is restored in the gap A, but not in the gap B and is reflected by a sharp and practically step function increase in the level of the pressure which is recovered by the tube 18, the pressure (and/or flow) level rising sharply to its original level and remaining at that level as the control signal frequency is further increased in the ultrasonic range. This characteristic of turbulence amplifiers is a physical manifestation of the return of the amplifier to a stable jet flow condition where laminar flow is restored in the gap. Numeral 43 designates this region of the gap A curve. Similarly, but at a higher critical acoustic frequency, $f_2$, the fluid flowing in the gap B will be restored to laminar flow conditions causing a practically step function increase in the pressure (and/or flow) level recovered by the collector tube 17. Numeral 44 designates this region of the gap B curve.

In accordance with conventional positive binary code representations of two discrete signal levels, a "high" level output signal is representive by the binary digit 1 or 1 "bit" and a "low" level output signal is representive by the binary digit 0 or 0 "bit." Numeral 45 refers to the ultrasonic frequency range at which a 1 bit output appears at the collector 18 and a 0 bit output simultaneously appears at the collector 17, or center band-pass frequency, being designated $f_0$ in FIG. 2. Accordingly, it will be apparent that the device 10 converts ultrasonic acoustic frequencies into logical outputs, representative of a particular frequency or range of frequencies. Since there may be slight inclinations of the leading edges forming the virtual step functions defining the regions 43 and 44 toward slightly higher frequency values, the lower frequency end of the bandpass 45 is conservatively considered to be that value of control signal frequency designated, $f'_1$, where the pressure of the fluid collected by the collector tube 18 attains a high enough level but not necessarily maximum, to drive or control a device receiving the fluid output of tube 18. The upper freqeuncy end of the bandpass 45 is also conservatively considered to be the value of control signal frequency $f_2$ instead of the corresponding slightly higher frequency $f'_2$. Thus, the frequency range of the bandpass 45 is expressible as the quantity $(f_2-f'_1)$. That device 10 may be used as a fluidic detector which is responsible to only a limited band or spectrum of ultrasonic frequencies centered on either side of the mid-bandpass frequency, but within the bandpass 45, will be evident to those working in the art.

All other critical factors remaining constant, the range of the bandpass 45 may be increased or decreased by appropriately changing the lengths of the gaps A and/or B. To illustrate, if the length of the gap B is increased, the pressure recovery region 44 will shift to the right, FIG. 2, a proportionate amount causing an increase in the value of the $f_2$, the range of the bandwidth 45, and an upward shift in the value of the frequency $f_0$. Conversely, if the length of gap A is decreased, the pressure recovery region 43 will shift to the left, FIG. 2, which proportionately increases the bandwidths of the bandpass 45 but decreases the value of $f'_1$ causing the frequency $f_0$ to shift to a lower frequency value. It will also be apparent that the frequency $f_0$ may be kept constant and the bandpass 45 increased by equally decreasing and increasing the gaps A and B, respectively. The converse is also true, as will be evident. Thus the device 10 may be "tuned" to a particular ultrasonic acoustic frequency by merely changing the length of the gap A and/or B. The mechanism for adjusting one or both of the gap lengths A and B may be calibrated to facilitate the tuning of the device 10 to detect various ultrasonic acoustic signals from whatever source derived. Further, by employing auxiliary moving mechanisms, a given frequency range may be periodically or aperiodically scanned (or swept) by alternately decreasing and increasing the lengths of both gaps A and B by equal amounts. To this end, the supply and collector tubes could be periodically or aperiodically reciprocated equal amounts in each direction in synchronism, utilizing for this purpose various conventional driving mechanisms such as bidirectionally-driven worms (similar to the worm 24, FIG. 1A, rotating cams or reciprocating linkages.

Since in accordance with a preferred embodiment of this invention, both pressure recovery regions 43 lie in the ultrasonic frequency range the detection of some dominant, but unknown, ultrasonic signal may be effected above a possibly disturbing audio level.

Conventional fluidic logic components, providing amplification if necessary, may be utilized in combination with the device 10 to convert the different binary signals available from the device into a fluid pulse which may then be used to drive or control other devices of suitable type, such as indicators and the like. To this end, the 0 bit output from the collector tube 17, and hence from the tube 22, is applied to one control nozzle of a conventional fluidic NOR gate 50. The 1 bit output from the collector tube 18 and hence from the tube 23 is applied via the latter tube to one control nozzle of a conventional fluidic signal inverter 51. Inverter 51 has its other control nozzle connected via a tube 52 and a pressure or flow regulating valve 53 to the line 34. The pressure of the fluid in the tube 52 is adjusted by turning the valve 53 until a 1 bit input from the tube 23 produce an 0 bit output in inverter 51 output tube 54, the latter tube being coupled to another control nozzle of the gate 50 and supplying fluid control signals thereto.

Figure 3:
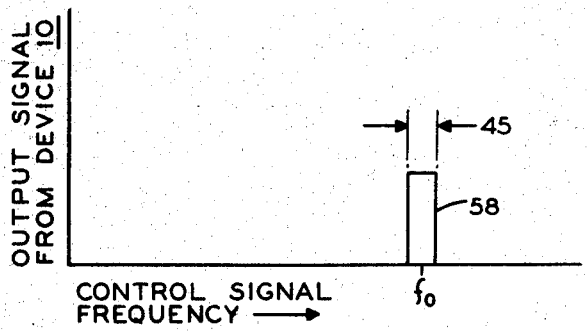
FIG. 3 illustrates a typical fluid pulse which may be produced by the instant apparatus in response to an ultrasonic acoustic signal having a frequency in the selected bandpass frequency of the apparatus.

The power nozzle of the gate 50 receives fluid from line 34 via a tube 55 under regulated pressure (and/or flow) controlled by valve 56. The gate 50 is enabled to produce a 1 bit output in the form of a substantially rectangular fluid pulse 8, FIG. 3, upon coincidentally receiving a 0 bit from the inverter 51 and a 0 bit from the tube 22. Thus, the production of a pulse 58 provides a positive signal indication that the acoustic control signal has a frequency within the established bandpass of the device. The pulse 58 may be applied via a tube 59 to drive or control any suitable device 60, such as an indicator, switch or motor which is capable of being driven or controlled by fluid pulses of this type.

While there has been described what is at present considered to be one embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. Apparatus comprising, at least two turbulence amplifiers, each of said amplifiers including means for issuing a substantially laminar fluid power stream and means spaced from the stream issuing means and positioned in the path of normal laminar flow for receiving at least a portion of said stream when laminar, the spacing between the means of each of said amplifiers defining an unbounded region for energy interaction between a corresponding power stream and a signal at some signal frequency, said amplifiers being mounted in close enough proximity for said signal to interact with both amplifier power streams, the dimensions of the regions of interaction considered along respective paths of normal laminar flows being different and such that one power stream is rendered turbulent through interaction with said signal while the outer power stream is substantially laminar.

2. The apparatus according to claim 1 which further comprises, a source of acoustic signal at ultrasonic frequency, and wherein said dimensions are such that said amplifiers simultaneously produce different valued logic output signals in the receiving means in response to an interacting acoustic signal at said ultrasonic frequency.

3. Fluid apparatus comprising: a plurality of nozzles mounted on said apparatus for issuing a plurality of substantially laminar fluid streams, a plurality of fluid collectors, each fluid collector being mounted on said apparatus in substantial alignment with a respective one of said nozzles so as to receive at least a portion of the laminar fluid stream issuing from its respective nozzle, each fluid collector being spaced from its respective nozzle by a different gap distance, and a source of acoustic signals, the acoustic signals being applied to interact with a plurality of the fluid streams, the distance between each collector and its respective nozzle being determined by a different acoustic signal frequency.

4. The apparatus as claimed in claim 3 which further comprises means for changing the gap distance between one of the fluid collectors and its respective nozzle.

5. The apparatus as claimed in claim 3, wherein one of the fluid collectors and its respective nozzle are mounted in parallel alignment with another one of the fluid collectors and its respective nozzle.

6. Fluid apparatus comprising first and second fluid supply tubes mounted adjacent one another for emitting respective first and second substantially laminar fluid streams, at least two fluid collector tubes, each collector tube being mounted in generally coaligned relationship with a different one of the supply tubes to receive the laminar stream emitted by its coaligned supply tube, the first and second supply tubes and respective coaligned collector tubes being spaced apart to form therebetween respective first and second gaps, the first and second gaps permitting energy interchanges between an acoustic signal at ultrasonic frequency and the respective first and second fluid streams flowing therethrough, the length of the first gap being such that the first fluid stream is substantially laminar at one ultrasonic acoustic signal frequency while the length of the second gap is such that the second fluid stream is rendered turbulent by said acoustic signal at said one frequency, whereby said collector tubes provide different level fluid output signals signifying the detection of said one frequency.

7. The apparatus as claimed in claim 6 wherein the length of the first gap is less than the length of the second gap.

8. In combination, the fluid apparatus as claimed in claim 6 and a source for producing said acoustic signal.

9. The apparatus as claimed in claim 6 wherein means are additionally provided for changing the length of at least one of said gaps.

10. The apparatus as claimed in claim 6 wherein means are additionally provided for changing the lengths of the first and second gaps.

11. In combination, the fluid apparatus as claimed in claim 6 and means coupled to the outputs of said collector tubes for converting the different level fluid output signals received therefrom into a fluid pulse.

12. The combination as claimed in claim 7 which further comprises, at least one fluidic device coupled to the outputs of said collector tubes for converting the different level fluid output signals received therefrom into a fluid pulse.

References Cited
UNITED STATES PATENTS

| | | | |
|---|---|---|---|
| 1,549,196 | 8/1925 | Hall | 137—81.5 X |
| 3,409,034 | 11/1968 | Rose | 137—81.5 |
| 3,416,551 | 12/1968 | Kinnel | 137—81.5 |
| 3,429,322 | 2/1969 | Metzger | 137—81.5 |

WILLIAM R. CLINE, Primary Examiner